United States Patent Office 2,876,240
Patented Mar. 3, 1959

2,876,240

THERAPEUTICALLY VALUABLE ESTERS AND METHODS FOR OBTAINING THE SAME

William H. Edgerton, Huntington Woods, Mich., assignor to Parke, Davis & Company, Detroit, Mich., a corporation of Michigan No Drawing. Application January 14, 1953
Serial No. 331,306

9 Claims. (Cl. 260—404.5)

This invention relates to a process for producing certain therapeutically valuable esters and to intermediate products useful in the production of such esters. More particularly, the present invention relates to a method for producing esters having the general formula

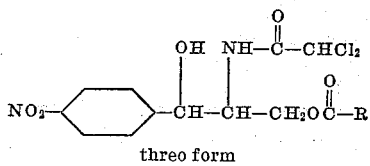

threo form where R is an aliphatic hydrocarbon radical containing seven to nineteen carbon atoms inclusive.

From the following description it will be apparent to those skilled in the art that the acid addition salts of 1-p-nitrophenyl-2-aminopropane-1,3-diol used as a starting material and the ester products of the invention exist in structural or diastereo-isomeric as well as optical isomeric form. The present invention is concerned with compounds having the "threo" diastereoisomeric as distinguished from the "erythro" diastereoisomeric form. The groups on the two asymmetric carbon atoms of such threo diastereoisomers have the same relative spacial configuration or arrangement as the groups on the two asymmetric carbon atoms of pseudo ephedrine and threose.

Because of the difficulty in representing these structural differences in graphic formulae, the customary structural formulae will be used in both the specification and claims and a notation placed below or to the side of the formula to designate the particular structural and optical configuration of the compound. Where the notation "threo form" appears, as it does above, the formula is to be interpreted in its generic sense, that is, as representing the "D-threo" and "L-threo" isomers in separated form as well as the racemic mixture thereof. Such a formula does not merely represent the optical mixture. In the specific formulae the notation [+] will be used to designate dextro optical rotation and the notation [—] to designate levo optical rotation.

In accordance with the invention 1-p-nitrophenyl-2-dichloroacetamido-3-acyloxypropane-1-ol compounds having the formula given above are produced by reacting an acid addition salt of 1-p-nitrophenyl-2-aminopropane-1,3-diol of formula

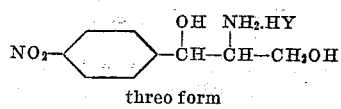

threo form with an acyl halide or anhydride of formula

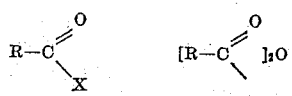

thereby producing an acid addition salt of a 1-p-nitrophenyl-2-amino-3-acyloxypropane-1-ol of formula

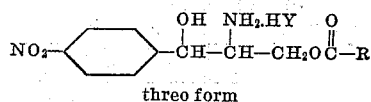

threo form and thereafter N-dichloroacetylating the said 1-p-nitrophenyl-2-amino-3-acyloxypropane-1-ol acid addition salt or, after neutralization, the free base thereof; where R is an aliphatic hydrocarbon radical containing seven to nineteen carbon atoms inclusive, X is a halogen atom and HY is one equivalent of a mineral acid. The transformations involved in the process can be diagrammatically illustrated as follows:

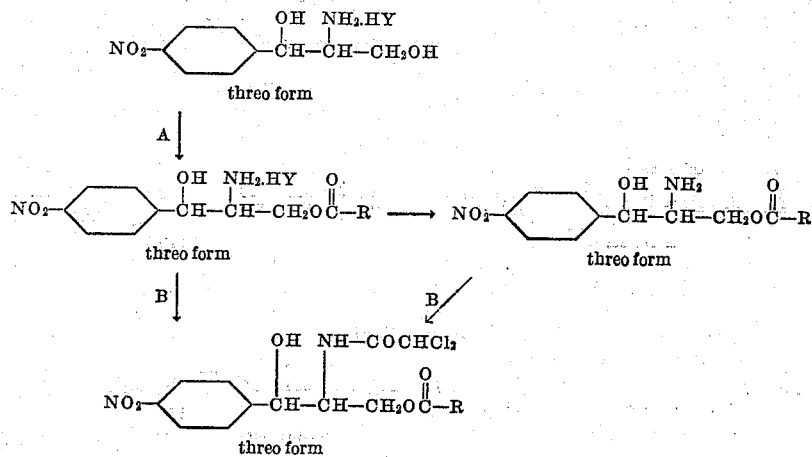

where R and HY have the same significance as given above.

As mentioned above, the transformation designated as A is brought about by reacting an acid addition salt of 1-p-nitrophenyl-2-aminopropane-1,3-diol with an acyl halide or anhydride. In carrying out the process any mineral acid salt of the amino diol compound can be used. For example, the hydrochloride, hydrobromide, sulfate, phosphate and the like salts can be employed as the starting material. The reaction is preferably carried out under anhydrous conditions in a medium which is less basic than the free amino diol compound. The preferred basic media are the N,N-dialkylamides of lower fatty acids such as N,N-dimethyl formamide, N,N-dimethyl acetamide, N,N-diethyl formamide and the like. If desired, an inert organic solvent such as benzene, xylene, toluene, dioxane and the like can be used but it is usually more convenient to merely employ a large excess of the weakly basic medium. Best results are obtained when an acyl halide is used as the acylating agent. The temperature during the process can be varied somewhat but in general there is no particular advantage in employing a temperature above 50° C. Room temperatures are preferred and, when a basic medium is used, it is unnecessary to employ elevated temperatures since the reaction proceeds readily at temperatures in the neighborhood of 20 to 35° C. In practicing the present invention best results are obtained when approximately equivalent quantities of 1-p-nitrophenyl-2-aminopropane-1,3-diol hydrochloride and acylating agent are used but, of course, a small excess of either reactant can be used, if desired.

The N-dichloroacetylation [B in the above diagram] of the acid addition salt of 1-p-nitrophenyl-2-amino-3-acyloxypropane-1-ol compound or, after neutralization, of the free base of said compound can be carried out in several ways. As dichloroacetylating agents dichloroacetyl halides, dichloroacetic anhydride, esters of dichloroacetic acid, N-acyl dichloroacetamides, chloral cyanohydrin and a combination of chloral, an alkali metal cyanide and alkali may be used. When employing the free base of the amino diol compound as the starting material any of the foregoing dichloroacetylating agents are suitable but when the amino diol compound is in the form of an acid addition salt an alkaline material should be added to the reaction mixture to liberate the free amino diol in situ or dichloroacetic anhydride, a dichloroacetyl halide, chloral cyanohydrin or the aforementioned chloral combination should be used as the dichloroacetylating agent. The dichloroacetylation can be carried out under either aqueous or anhydrous conditions as will be apparent from the description of the specific dichloroacetylating methods which follow.

The preferred method of dichloroacetylation involves the use of the free base of the 1-p-nitrophenyl-2-amino-3-acyloxypropane-1-ol compound and a lower alkyl ester of dichloroacetic acid. The reaction is carried out under anhydrous conditions either in the presence or absence of a solvent such as an alkyl ester of a lower fatty acid, a lower aliphatic alcohol, dioxane, and the like. In carrying out the reaction, temperatures up to about 120° C. can be used but for most purposes a temperature of 75° C. or less is satisfactory.

When using a dichloroacetyl halide or dichloroacetic anhydride as the dichloroacetylating agent the amino diol compound can be in either the free base or acid addition salt form and either anhydrous or aqueous conditions can be employed. When carrying out the reaction under anhydrous conditions the amino diol or its acid addition salt is brought into contact with the dichloroacetylating agent at a temperature below about 125° C. either in the presence or absence of an inert organic solvent. When the starting material is an acid addition salt the reaction proceeds more slowly than it does when the free amino diol is employed and consequently it is preferable to employ a higher reaction temperature and prolong the reaction time. The dichloroacetyl halides react much more rapidly than does dichloroacetic anhydride and therefore when using the dichloroacetyl halides lower reaction temperatures and shorter reaction times are employed. As solvents, benzene, toluene, xylene, dioxane and the like as well as an excess of the acylating agent can be used.

The reaction between the dichloroacetyl halides or dichloroacetic anhydride and the amino diol compound can also be carried out under aqueous conditions in the presence of an alkaline substance. This is usually accomplished by employing a two phase reaction mixture wherein the amino diol is dissolved in an organic solvent such as ethyl acetate or the like and the organic solvent solution shaken with the dichloroacetylating agent and an aqueous solution of the alkaline catalyst. The best results are obtained when the reaction temperature is maintained below about 30° C. and the mixture kept alkaline by the period addition of the acylation catalyst. As basic catalysts the alkali metal bicarbonates, carbonates and hydroxides can be used.

If desired, dichloroacetylation may be accomplished by reacting the free base of the 1-p-nitrophenyl-2-amino-3-acyloxypropane-1-ol compound with an N-acylated dichloroacetamide. Of particular interest as dichloroacetylating agents are those N-acylated dichloroacetamides in which the N-acyl substituent is derived from a lower aliphatic carboxylic acid, a halogen substituted lower aliphatic carboxylic acid, an alkoxy substituted lower aliphatic acid, benzoic acid, a benzoic acid containing one or more ring substituents such as alkyl, alkoxy, halogen and nitro groups and the like. In carrying out the process alcoholic, aqueous, or aqueous alcoholic solvents may be used. For example, water, aqueous methanol, aqueous ethanol, methanol, ethanol, isopropanol, butanol, and the like can be employed. The reaction can be carried out at a temperature below 50° C. but it is preferable to carry it out at about room temperature, that is 20 to 30° C.

Dichloroacetylation of the free base, that is the 1-p-nitrophenyl-2-amino-3-acyloxypropane-1-ol compound, may also be accomplished by reaction with chloral cyanhydrin or a chloral cyanhydrin-yielding material, in the presence of an acid-binding agent, at a temperature below about 100° C. Preferred acid binding agents are sodium bicarbonate, magnesium oxide, pyridine, trialkyl amines such as trimethylamine, and the like. The reaction medium may be an aqueous or non-aqueous inert organic medium, the preferred medium being dioxane when using chloral cyanhydrin. When using a chloral cyanhydrin yielding material, it is important to employ a medium which contains at least a minor proportion of water. As chloral cyanhydrin yielding materials it is preferable to employ chloral and an alkali metal cyanide in conjunction with an aqueous reaction medium at a temperature between 60 and 100° C. The preferred reaction temperature using chloral cyanhydrin is between 0 and 25° C.

The invention is illustrated by the following examples:

*Example 1*

[a] A solution of 70 g. of D-(—)-threo-1-p-nitrophenyl-2-aminopropane-1,3-diol hydrochloride in 125 ml. of dimethyl formamide is stirred and 78.5 g. of palmitoyl chloride is added drop-wise to the stirred solution. The mixture is allowed to stand for 48 hours and is then diluted with 5 lbs. of ether. A white solid material separates and is dissolved in hot absolute alcohol. Upon cooling the desired D-(+)-threo-1-p-nitrophenyl-2-amino-3-palmitoyloxypropane-1-ol hydrochloride separates from the solution. The product is collected and purified by recrystallization from ethanol; $[\alpha]_D^{26} = +6.2°$ in dimethyl acetamide (1.46%), +9.5° in absolute ethanol (0.9%). The formula of this product is

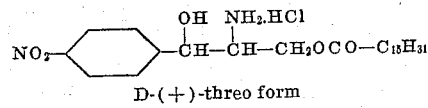

D-(+)-threo form

[b] A suspension of 2.4 g. of D-(+)-threo-1-p-nitrophenyl-2-amino-3-palmitoyloxypropane-1-ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired D-(+)-threo-1-p-nitrophenyl-2-dichloroacetamido-3-palmitoyloxypropane-1-ol crystallizes out and is recovered. This product which is a white crystalline solid melts at 90° C. after recrystallization from benzene; $[\alpha]_D^{26} = +5.1°$ in ethyl acetate. It has the formula

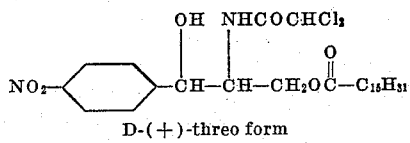

D-(+)-threo form

[c] A mixture consisting of 2.4 g. of D-(+)-threo-1-p-nitrophenyl-2-amino-3-palmitoyloxypropane-1-ol hydrochloride, 100 ml. of ether and 100 ml. of a saturated aqueous solution of sodium bicarbonate is shaken until all the solid dissolves. The ether layer is separated, washed with water and dried. Evaporation of the ether yields the desired D-(+)-threo-1-p-nitrophenyl-2-amino-3-palmitoyloxypropane-1-ol. The formula of this product is

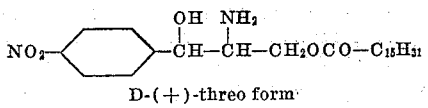

D-(+)-threo form

A solution consisting of 4 g. of D-(+)-threo-1-p-nitrophenyl-2-amino-3-palmitoyloxypropane-1-ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum ether. Upon standing the desired D-(+)-threo-1-p-nitrophenyl-2-dichloroacetamido-3-palmitoyloxypropane-1-ol separates from the solution; M. P. 90° C. after recrystallization from xylene. The formula of this product is

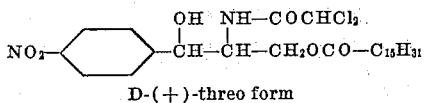

D-(+)-threo form

Example 2

[a] A solution of 70 g. of D-(−)-threo-1-p-nitrophenyl-2-aminopropane-1,3-diol hydrochloride in 125 ml. of dimethyl formamide is stirred and 86.6 g. of stearoyl chloride is added drop-wise to the stirred solution. The mixture is allowed to stand for 48 hours and is then diluted with 5 lbs. of ether. The white solid which separates is dissolved in hot absolute alcohol. Upon cooling, D-(+)-threo-1-p-nitrophenyl-2-amino-3-stearoyloxypropane-1-ol hydrochloride separates from the solution. The product is collected and purified by recrystallization from ethanol. The formula of this product is

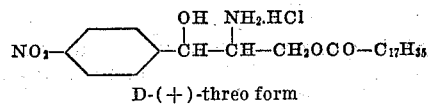

D-(+)-threo form

[b] A mixture consisting of 2.5 g. of D-(+)-threo-1-p-nitrophenyl-2-amino-3-stearoyloxypropane-1-ol hydrochloride, 100 ml. of ether and 100 ml. of a saturated aqueous solution of sodium bicarbonate is shaken until all of the solid dissolves. The ether layer is separated, washed with water and dried. The ether is evaporated to isolate the D-(+)-threo-1-p-nitrophenyl-2-amino-3-stearoyloxypropane-1-ol. The formula of this product is

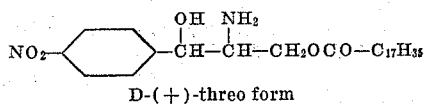

D-(+)-threo form

A solution consisting of 4 g. of D-(+)-threo-1-p-nitrophenyl-2-amino-3-stearoyloxypropane-1-ol and 20 ml. of methyl dichloroacetate in 40 ml. of methanol is refluxed for forty-eight hours. The methanol is distilled off and the residue washed with petroleum ether. The solid product is collected, dissolved in xylene, and the solution is diluted to the point of turbidity with petroleum ether. The desired D-(+)-threo-1-p-nitrophenyl-2-dichloroacetamido-3-stearoyloxypropane-1-ol which separates from the solution upon standing, has after recrystallization from benzene a melting point of 91–92° C.; $(\alpha)_D^{26} = +5.75°$ in ethyl acetate. The formula of this product is

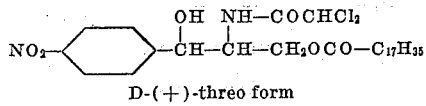

D-(+)-threo form

Example 3

[a] A solution of 70 g. of DL-threo-1-p-nitrophenyl-2-aminopropane-1,3-diol hydrochloride in 125 ml. of dimethyl formamide is stirred and 78.5 g. of palmitoyl chloride is added drop-wise to the stirred solution. The mixture is allowed to stand for 48 hours and is then diluted with 5 lbs. of ether. A white solid material separates and is dissolved in hot absolute alcohol. Upon cooling, the desired DL-threo-1-p-nitrophenyl-2-amino-3-palmitoyloxypropane-1-ol hydrochloride separates from the solution. The product is collected and purified by recrystallization from ethanol; the formula of this product is

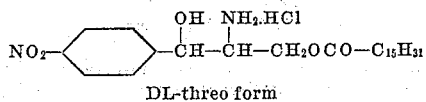

DL-threo form

[b] A suspension of 2.4 g. of DL-threo-1-p-nitrophenyl-2-amino-3-palmitoyloxypropane-1-ol hydrochloride in a solution of 1.3 g. of dichloroacetic anhydride and 40 ml. of benzene is heated at reflux for 24 hours. Insoluble material is separated by filtration and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired DL-threo-1-p-nitrophenyl-2-dichloroacetamido-3-palmitoyloxypropane-1-ol crystallizes out and is removed. This product which is a white crystalline solid [M. P. 90–91° C.] has the formula

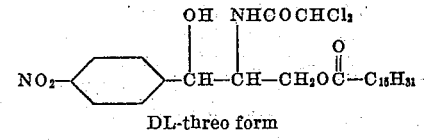

DL-threo form

[c] A mixture consisting of 2.4 g. of DL-threo-1-p-nitrophenyl-2-amino-3-palmitoyloxypropane-1-ol hydrochloride, 100 ml. of ether and 100 ml. of a saturated aqueous solution of sodium bicarbonate is shaken until all the solid dissolves. The ether layer is separated, washed with water and dried. Evaporation of the ether yields the desired DL-threo-1-p-nitrophenyl-2-amino-3-palmitoyloxypropane-1-ol. The formula of this product is

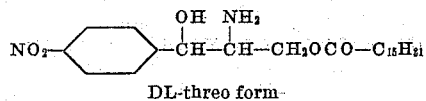

DL-threo form

A solution consisting of 4 g. of DL-threo-1-p-nitrophenyl-2-amino-3-palmitoyloxypropane-1-ol and 20 ml. of methyl dichloroacetate in 40 ml. of methanol is heated under reflux for forty-eight hours. The methanol is removed by distillation and the residue washed with petroleum ether. The solid product is collected, dissolved in xylene and the solution diluted to the point of turbidity with petroleum etther. Upon standing the desired DL-threo - 1 - p - nitrophenyl - 2 - dichloroacetamido - 3- palmitoyloxypropane-1-ol separates from the solution; M. P. 90–91° C. The formula of this product is

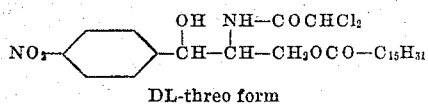

DL-threo form

*Example 4*

[a] 70 g. of D-(—)-threo-1-p-nitrophenyl-2-aminopropane-1,3-diol hydrochloride is dissolved in 125 ml. of dimethyl formamide, and 62.7 g. of lauroyl chloride is added drop-wise with stirring. The mixture is allowed to stand for 24 hours and is then diluted with ether [5 lbs.]. A white solid separates and is dissolved in hot absolute alcohol. The solution is cooled, and the product, D - (+) - threo - 1 - p - nitrophenyl - 2 - amino - 3- lauroyloxypropane-1,3-diol hydrochloride, separates out. The product is collected and purified by recrystallization from ethanol. The formula of this product is

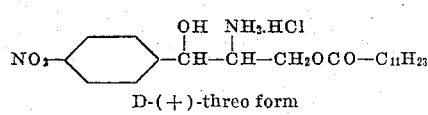

D-(+)-threo form

[b] 2 g. of D-(+)-threo-1-p-nitrophenyl-2-amino-3-lauroyloxypropane-1-ol hydrochloride is shaken with 100 ml. of ether and 100 ml. of a saturated aqueous solution of sodium bicarbonate, until all of the solid dissolves. The ether layer is separated, washed with water and dried. The ether is evaporated, leaving the free base, D - (+) - threo - 1 - p - nitrophenyl - 2 - amino - 3- lauroyloxypropane-1-ol. The formula of this product is

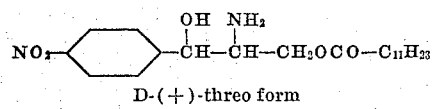

D-(+)-threo form

A solution consisting of 3.8 g. of D-(+)-threo-1-p-nitrophenyl - 2 - amino - 3 - lauroyloxypropane - 1 - ol, 20 ml. of methyl dichloroacetate and 40 ml. of methanol is heated under reflux for thirty hours. The methanol is removed by distillation and the residue washed with petroleum ether. The solid product is collected, dissolved in xylene and the solution diluted to turbidity with petroleum ether. D-(+)-threo-1-p-nitrophenyl-2-dichloroacetamido-3-lauroyloxypropane-1-ol separates from the solution on standing; M. P. 79–80° C.; $(\alpha)_D^{26} = +8.4°$ in ethyl acetate. The formula of this product is

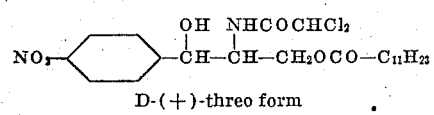

D-(+)-threo form

*Example 5*

[a] A solution of 70 g. of L-(+)-threo-1-p-nitrophenyl-2-aminopropane-1,3-diol hydrochloride in 125 ml. of dimethyl formamide is stirred and 78.5 g. of palmitoyl chloride is added drop-wise to the stirred solution. The mixture is allowed to stand 48 hours and is then diluted with 5 lbs. of ether. A white solid material separates and is dissolved in hot absolute alcohol. Upon cooling, 44.5 g. of the desired L-(—)-threo-1-p-nitrophenyl-2-amino-3-palmitoyloxypropane-1-ol hydrochloride separates from the solution. The product is collected and purified by recrystallization from ethanol; M. P. 121–122° C.; $[\alpha]_D^{26} = -6.2°$ in dimethyl acetamide (1.46%), $-9.5°$ in absolute ethanol (0.9%). The formula of this product is

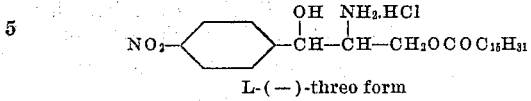

L-(—)-threo form

[b] A suspension of 2.4 g. of L-(—)-threo-1-p-nitrophenyl - 2 - amino - 3 - palmitoyloxypropane - 1 - ol hydrochloride in a solution of 1.3 g. of dichloroacetic anhydride and 40 ml. of benzene is heated at reflux for 24 hours. Insoluble material is filtered off and discarded. The filtrate is concentrated to 15 ml. and diluted to turbidity with petroleum ether. Upon cooling an oil layer separates. The oil layer is collected and washed with small amounts of water followed by washing with sodium bicarbonate solution. The washed oil layer is taken up in a minimum of hot xylene and after standing at a temperature of about 0 to 10° C., the desired L-(—)-threo - 1 - p - nitrophenyl - 2 - dichloroacetamido - 3- palmitoyloxypropane-1-ol crystallizes out and is recovered. This product which is a white crystalline solid melts at 90° C. after recrystallization from benzene; $[\alpha]_D^{26} = -5.1°$ in ethyl acetate. It has the formula

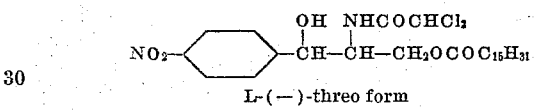

L-(—)-threo form

[c] A mixture consisting of 2.4 g. of L-(—)-threo-1-p-nitrophenyl-2 - amino-3-palmitoyloxypropane-1-ol hydrochloride, 100 ml. of ether and 100 ml. of a saturated aqueous solution of sodium bicarbonate is shaken until all of the solid dissolves. The ether layer is separated, washed with water and dried. Evaporation of the ether yields the desired L-(—)-threo-1-p-nitrophenyl-2-amino-3-palmitoyloxypropane-1-ol which after recrystallization from isopropanol melts at 78–79° C. The formula of this product is

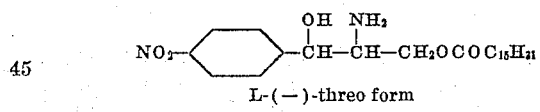

L-(—)-threo form

A solution consisting of 4 g. of L-(—)threo-1-p-nitrophenyl-2-amino-3-palmitoyloxypropane-1-ol and 20 ml. of methyl dichloroacetate in 40 ml. of methanol is heated under reflux for 48 hours. The methanol is removed by distillation in vacuo and the cooled residue washed with petroleum ether. The solid product is collected, dissolved in xylene and the solution diluted to the point of turbidity with petroleum ether. Upon standing, the desired L-(—)-threo-1-p-nitrophenyl-2-dichloroacetamido-3-palmitoyloxypropane-1-ol separates from the solution and is collected and recrystallized from xylene; M. P. 87–89° C.; $[\alpha]_D^{26} = -5.1°$ in ethyl acetate. The formula of this product is

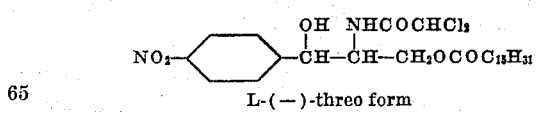

L-(—)-threo form

What I claim is:
1. D-(+)-threo-1-p-nitrophenyl-2-amino-3 - palmitoyloxypropane-1-ol.
2. D-(+)-threo-1-p-nitrophenyl - 2-amino-3-palmitoyloxypropane-1-ol hydrochloride.
3. DL-threo-1-p-nitrophenyl - 2-amino - palmitoyloxypropane-1-ol.
4. D-(+)-threo-1-p-nitrophenyl-2 - amino-3 - stearoyloxypropane-1-ol.

5. Process for producing a compound of formula,

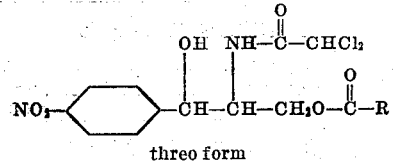

threo form which comprises reacting an acid addition salt of 1-p-nitrophenyl-2-aminopropane-1,3-diol of formula,

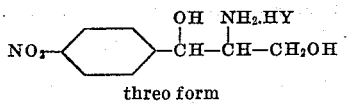

threo form with a substantially equivalent amount of an acylating agent of the class consisting of acyl halides of formula,

and acyl anhydrides of formula,

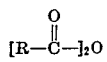

under anhydrous conditions at a temperature not substantially over 50° C. thereby producing an acid addition salt of 1-p-nitrophenyl-2-amino-3-acyloxypropane-1-ol of formula,

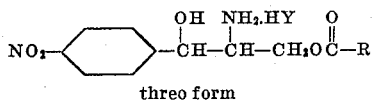

threo form and thereafter N-dichloroacetylating the said 1-p-nitrophenyl-2-amino-3-acyloxypropane-1-ol acid addition salt where R is alkyl containing seven to nineteen carbon atoms inclusive, X is halide and HY is one equivalent of a mineral acid.

6. Process for producing a compound of formula,

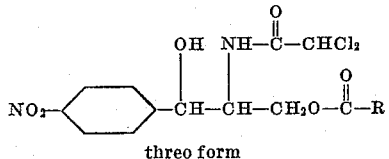

threo form which comprises reacting at a temperature not greater than about 50° C. an acid addition salt of 1-p-nitrophenyl-2-aminopropane-1,3-diol of formula,

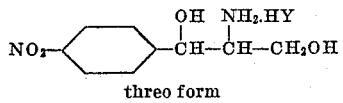

threo form with a substantially equivalent amount of an acylating agent of the class consisting of acyl halides of formula,

and acyl anhydrides of formula,

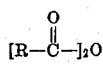

under anhydrous conditions thereby producing an acid addition salt of a 1-p-nitrophenyl-2-amino-3-acyloxypropane-1-ol of formula,

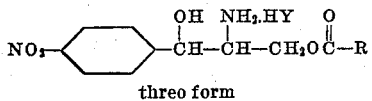

threo form neutralizing said acid addition salt and N-dichloroacetylating the 1-p-nitrophenyl-2-amino-3-acyloxypropane-1-ol so obtained by reaction with a lower alkyl ester of dichloroacetic acid; where R is alkyl containing seven to nineteen carbon atoms inclusive, X is halide and HY is one equivalent of a mineral acid.

7. Process for producing a compound of formula,

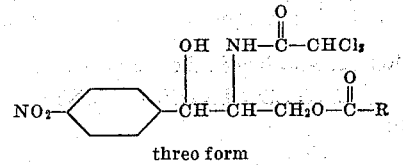

threo form which comprises reacting at a temperature not greater than about 50° C. an acid addition salt of a 1-p-nitrophenyl-2-aminopropane-1,3-diol of formula,

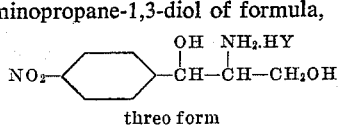

threo form with a substantially equivalent amount of an acylating agent of the class consisting of acyl halides of formula,

and acyl anhydrides of formula, $$[R-\overset{O}{\underset{\|}{C}}-]_2O$$

under anhydrous condtions thereby producing an acid addition salt of a 1-p-nitrophenyl-2-amino-3-acyloxypropane-1-ol of formula,

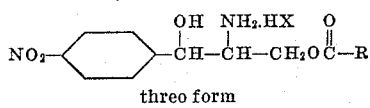

threo form and thereafter reacting under anhydrous conditions the said 1-p-nitrophenyl-2-amino-3-acyloxypropane-1-ol acid addition salt with an acylating agent of the class consisting of dichloroacetyl halides and dichloroacetic anhydride; where R is alkyl containing seven to nineteen carbon atoms inclusive, X is halide and HY is one equivalent of a mineral acid.

8. Process which comprises reacting D-(−)-threo-1-p-nitrophenyl-2-aminopropane-1,3-diol hydrochloride in anhydrous dimethyl formamide with a substantially equivalent amount of palmitoyl chloride at a temperature not substantially over 50° C. thereby obtaining D-(+)-threo-1 - p - nitrophenyl - 2-amino-3-palmitolyloxypropane-1-ol hydrochloride.

9. Process which comprises reacting an acid addition salt of 1-p-nitrophenyl-2-aminopropane-1,3-diol of formula,

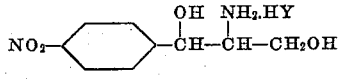

with a substantially equivalent amount of an acylating agent of the class consisting of acyl halides of formula,

and acyl anhydrides of formula,

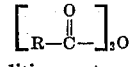

under anhydrous conditions at a temperature not substantially over 50° C. thereby producing an acid addition salt of 1-p-nitrophenyl-2-amino-3-acyloxypropane-1-ol of formula,

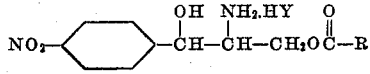

and neutralizing to obtain a compound having the formula,

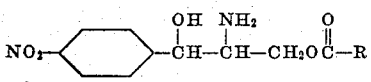

where R is alkyl containing 7 to 19 carbon atoms, X is halide and HY is one equivalent of a mineral acid.

References Cited in the file of this patent

UNITED STATES PATENTS

| | | |
|---|---|---|
| 2,483,884 | Crooks et al. | Oct. 4, 1949 |
| 2,514,376 | Crooks et al. | July 11, 1950 |
| 2,662,906 | Edgerton | Dec. 15, 1953 |
| 2,791,595 | Edgerton | May 7, 1957 |

FOREIGN PATENTS

| | | |
|---|---|---|
| 501,678 | Belgium | Mar. 31, 1951 |
| 503,348 | Belgium | June 15, 1951 |
| 503,675 | Belgium | June 30, 1951 |

OTHER REFERENCES

Ueyanagi: "J. Pharm. Soc. Japan," vol. 71, No. 12, December 1951, pages 1409–19.

Rebstock: "J. Am. Chem. Soc.," vol. 72 (1950), pages 4800–4803.